US006988962B2

(12) United States Patent
Sullivan et al.

(10) Patent No.: US 6,988,962 B2
(45) Date of Patent: *Jan. 24, 2006

(54) MULTI-LAYERED CORE GOLF BALL

(75) Inventors: Michael J Sullivan, Barrington, RI (US); Derek A Ladd, Acushnet, MA (US); Antonio U DeSimas, East Providence, RI (US)

(73) Assignee: Acushnet Company, Fairhaven, MA (US)

(*) Notice: Subject to any disclaimer, the term of this patent is extended or adjusted under 35 U.S.C. 154(b) by 72 days.

This patent is subject to a terminal disclaimer.

(21) Appl. No.: 10/797,810

(22) Filed: Mar. 10, 2004

(65) Prior Publication Data

US 2004/0171437 A1     Sep. 2, 2004

Related U.S. Application Data

(60) Continuation-in-part of application No. 10/341,574, filed on Jan. 13, 2003, now Pat. No. 6,852,044, which is a continuation-in-part of application No. 10/002,641, filed on Nov. 28, 2001, now Pat. No. 6,547,677, which is a continuation-in-part of application No. 09/948,692, filed on Sep. 10, 2001, which is a continuation-in-part of application No. 09/172,608, filed on Oct. 15, 1998, now Pat. No. 6,302,808, which is a division of application No. 08/943,932, filed on Oct. 3, 1997, now Pat. No. 6,056,842.

(51) Int. Cl.
*A63B 37/06* (2006.01)

(52) U.S. Cl. .................................................. 473/376
(58) Field of Classification Search ................ 473/376, 473/373, 374, 367, 368
See application file for complete search history.

(56) References Cited

U.S. PATENT DOCUMENTS

| 4,508,309 | A | 4/1985 | Brown ......................... 249/81 |
| 4,625,964 | A | 12/1986 | Yamada ....................... 273/62 |
| 5,048,126 | A | 9/1991 | McLaughlin .................. 2/125 |
| 5,104,126 | A | 4/1992 | Gentiluomo ................. 273/228 |
| 5,184,828 | A | 2/1993 | Kim et al. .................... 273/228 |
| 5,273,286 | A | 12/1993 | Sun ............................. 273/228 |
| 5,334,673 | A | 8/1994 | Wu ........................... 273/235 R |
| 5,482,285 | A | 1/1996 | Yabuki et al. ................ 273/228 |
| 5,743,816 | A | 4/1998 | Ohsumi et al. .............. 473/376 |
| 5,772,531 | A | 6/1998 | Ohsumi et al. .............. 473/376 |
| 5,824,746 | A | 10/1998 | Harris et al. ................. 525/196 |
| 5,908,358 | A | 6/1999 | Wu ............................. 473/378 |
| 5,919,100 | A | 7/1999 | Boehm et al. ............... 473/354 |
| 5,929,189 | A | 7/1999 | Ichikawa et al. .............. 528/76 |
| 5,971,870 | A | 10/1999 | Sullivan et al. .............. 473/373 |
| 6,025,442 | A | 2/2000 | Harris et al. ................. 525/221 |
| 6,056,842 | A | 5/2000 | Dalton et al. ................ 156/243 |
| 6,117,024 | A | 9/2000 | Dewanjee .................... 473/351 |
| 6,120,393 | A | 9/2000 | Sullivan et al. .............. 473/377 |
| 6,142,887 | A | 11/2000 | Sullivan et al. .............. 473/374 |
| 6,210,294 | B1 | 4/2001 | Wu ............................. 473/371 |

(Continued)

*Primary Examiner*—Raeann Gorden

(74) *Attorney, Agent, or Firm*—D. Michael Burns

(57) ABSTRACT

The present invention is directed towards a multi-layered core golf ball that comprises a center, a cover and at least two core layers formed around the center to create an inner ball, wherein the outermost core layer is relatively stiff and hard relative to the center. At least the center or/and one core layer is comprised of an ionomer resin having a fully neutralized acid moiety.

30 Claims, 8 Drawing Sheets

U.S. PATENT DOCUMENTS

| | | | |
|---|---|---|---|
| 6,302,808 B1 | 10/2001 | Dalton et al. | 473/371 |
| 6,309,313 B1 | 10/2001 | Peter | 473/377 |
| 6,476,176 B1 | 11/2002 | Wu | 528/76 |
| 6,547,677 B2 * | 4/2003 | Sullivan et al. | 473/376 |
| 6,653,382 B1 | 11/2003 | Statz et al. | 524/400 |
| 6,852,044 B2 * | 2/2005 | Sullivan et al. | 473/376 |
| 2002/0019268 A1 | 2/2002 | Tsunoda et al. | 473/351 |
| 2003/0050373 A1 | 3/2003 | Chen et al. | 524/322 |
| 2003/0114565 A1 | 6/2003 | Chen et al. | 524/322 |
| 2003/0130434 A1 | 7/2003 | Statz et al. | 525/329.5 |

\* cited by examiner

MULTI-LAYERED CORE GOLF BALL

CROSS REFERENCE TO RELATED APPLICATIONS

This application is a continuation-in-part of U. S. patent application Ser. No. 10/341,574, filed Jan. 13, 2003, now U.S. Pat. No. 6,852,044, which is a continuation-in-part of U.S. patent application Ser. No. 10/002,641, filed Nov. 28, 2001, now U.S. Pat. No. 6,547,677, which is a continuation-in-part of U.S. patent application Ser. No. 09/948,692, filed Sep. 10, 2001, which is a continuation-in-part of U.S. patent application Ser. No. 09/172,608, filed Oct. 15, 1998, now U.S. Pat. No. 6,302,808, which is a division of U.S. patent application Ser. No. 08/943,932, filed Oct. 3, 1997, now U.S. Pat. No. 6,056,842, the disclosures of which are hereby incorporated by reference in their entirety.

FIELD OF THE INVENTION

The present invention is directed to improved golf balls and, specifically to golf balls comprised a multi-layered or multi-piece core. More particularly, to where one of the outer core layers comprises a highly neutralized polymer.

DESCRIPTION OF THE PRIOR ART

Generally, golf balls have been classified as wound balls or solid balls. Wound balls are generally constructed from a liquid or solid center surrounded by tensioned elastomeric material. Wound balls are generally thought of as performance golf balls and have a good resiliency, spin characteristics and feel when struck by a golf club. However, wound balls are generally difficult to manufacture when compared to solid golf balls.

Early solid golf balls were generally two piece balls, i.e., comprising a core and a cover. More recently developed solid balls are comprised of a core, a mantle layer and a cover, in order to improve the playing characteristics of the ball.

The prior art is comprised of a variety of golf balls that have been designed to provide particular playing characteristics. These characteristics are generally the initial velocity and spin of the golf ball, which can be optimized for various types of players. For instance, certain players prefer a ball that has a high spin rate in order to control and stop the golf ball. Other players prefer a ball that has a low spin rate and high resiliency to maximize distance. Generally, a golf ball having a hard core and a soft cover will have a high spin rate. Conversely, a golf ball having a hard cover and a soft core will have a low spin rate. Golf balls having a hard core and a hard cover generally have very high resiliency for distance, but are hard feeling and difficult to control around the greens. Various prior art references have been directed to adding a mantle layer or second cover layer to improve the playability of solid golf balls.

The spin rate of golf balls is the end result of many variables, one of which is the distribution of the density or specific gravity within the ball. Spin rate is an important characteristic of golf balls for both skilled and recreational golfers. High spin rate allows the more skilled players, such as PGA professionals and low handicapped players, to maximize control of the golf ball. A high spin rate golf ball is advantageous for an approach shot to the green. The ability to produce and control backspin to stop the ball on the green and side spin to draw or fade the ball substantially improves the player's control over the ball. Hence, the more skilled players generally prefer a golf ball that exhibits high spin rate.

On the other hand, recreational players who cannot intentionally control the spin of the ball generally do not prefer a high spin rate golf ball. For these players, slicing and hooking are the more immediate obstacles. When a club head strikes a ball, an unintentional side spin is often imparted to the ball, which sends the ball off its intended course. The side spin reduces the player's control over the ball, as well as the distance the ball will travel. A golf ball that spins less tends not to drift off-line erratically if the shot is not hit squarely off the club face. The low spin ball will not cure the hook or the slice, but the lower spin will reduce the adverse effects of the side spin. Hence, recreational players prefer a golf ball that exhibits low spin rate.

Re-allocating the density or specific gravity of the various layers or mantles in the ball is an important means of controlling the spin rate of golf balls. In some instances, the weight from the outer portions of the ball is redistributed to the center of the ball to decrease the moment of inertia thereby increasing the spin rate. For example, U.S. Pat. No. 4,625,964 discloses a golf ball with a reduced moment of inertia having a core with specific gravity of at least 1.50 and a diameter of less than 32 mm and an intermediate layer of lower specific gravity between the core and the cover. U.S. Pat. No. 5,104,126 discloses a ball with a dense inner core having a specific gravity of at least 1.25 encapsulated by a lower density syntactic foam composition. U.S. Pat. No. 5,048,838 discloses another golf ball with a dense inner core having a diameter in the range of 15–25 mm with a specific gravity of 1.2 to 4.0 and an outer layer with a specific gravity of 0.1 to 3.0 less than the specific gravity of the inner core. U.S. Pat. No. 5,482,285 discloses another golf ball with reduced moment of inertia by reducing the specific gravity of an outer core to 0.2 to 1.0.

In other instances, the weight from the inner portion of the ball is redistributed outward to increase the moment of inertia thereby decreasing the spin rate. U.S. Pat. No. 6,120,393 discloses a golf ball with a hollow inner core with one or more resilient outer layers, thereby giving the ball a soft core, and a hard cover. U.S. Pat. No. 6,142,887 discloses an increased moment of inertia golf ball comprising one or more mantle layers made from metals, ceramic or composite materials, and a polymeric spherical substrate disposed inwardly from the mantle layers.

These and other references disclose specific examples of high and low spin rate ball with ranges of specific gravity, ranges of diameter for the core and ranges of thickness for the outer layers, etc. They, however, do not offer any universal guidelines to control the spin rate of golf balls. Hence, there remains a need in the art for an improved golf ball with controlled spin rates.

Other prior art golf balls have multiple core layers to provide desired playing characteristics. For example, U.S. Pat. No. 5,184,828 claims to provide a golf ball having two core layers configured to provide superior rebound characteristics and carry distance, while maintaining adequate spin rate. More particularly, the patent teaches an inner core and an outer layer and controlling the hardness distribution in the outer layer and in the inner core in such a way that the golf ball has a maximum hardness at the outer site of the inner core. The patent alleges that such a distribution of hardness in the core assembly allows high energy to accumulate at the interface region where the hardness is at a maximum. The patent further claims that the energy of the club face is efficiently delivered to the maximum hardness region and transferred toward the inner core, resulting in a high rebound coefficient. However, since golf balls having hard cores and soft covers provide the most spin, the distribution taught by this patent would result in maximum core hardness at the interface when hit by a driver. Therein the ball has a relatively high driver spin rate and not very good distance. Since the ball in this patent has a softer outer core layer, the ball should have a lower spin rate for shorter shots such as an eight iron, where spin is more desirable. Thus, the ball taught by this patent appears to have many disadvantages.

In order to improve the playing characteristics of a solid golf ball, Kasco, Inc. provided a ball called Rockets™. The Rockets™ ball is comprised of a center, two layers and a cover. The center and the two layers are all comprised of polybutadiene rubbers.

In particular, tests on such balls have shown that golf balls are comprised of a center having a diameter of about 1.0 inch, a first layer having an average thickness of about 0.125 inch and a second layer having an average thickness of about 0.13 inch. The center has a Shore C hardness of about 59 at the center and 60 at the center mid point between the core center and the outer surface of the center. The first layer has a Shore C hardness of about 61, and the second layer has a Shore C hardness of about 73. The cover of the Rockets™ golf balls are harder than 65 Shore D and the compression is about 88.

Based upon the parting lines at each layer, it appears that Kasco manufactures the Rockets™ golf ball core by forming the center, compression molding the first layer around the center and compression molding the second layer onto the center and first layer. It appears that the cover is molded using a retractable pin injection mold. The problem with the Kasco method is that the golf balls thus formed have non-concentric cores. That is, the center of the ball is not concentric with the remainder of the ball and the layers do not have uniform thickness. More particularly, the first layer was measured to have a maximum thickness on one side of 0.139 inch and a minimum thickness on the opposing side of 0.106 inch. Thus, there was a variance of 0.033 inch in the thickness of the first layer. Similarly, the second layer was measured to have a maximum thickness of 0.155 on a first side and a minimum thickness of 0.113 inch on the opposing side. Therefore, there was a difference of 0.042 inch in the thickness of the second layer. Thus it is evident that there is a significant concentricity problem in these golf balls.

SUMMARY OF THE INVENTION

The present invention is directed to an improved golf ball having a core comprised of a center and multiple core layers to improve the playing characteristics of the golf ball. More particularly, the invention comprises a golf ball having a multi-layer or multi-piece core comprising an innermost core and at least one outer core layer wherein at least one core layer comprises a highly neutralized polymer. The center is preferably comprised of a thermoset composition such as high cis or trans polybutadiene or may comprise a thermoset or thermoplastic metallocene such as polybutadiene, polyethylene copolymer.

At least one core layer should be significantly stiffer and harder than the innermost core. At least one layer has a Shore C hardness of greater than 80 and preferably greater than 85 with a flex modulus of greater than about 30,000 psi and preferably, greater than 40,000 psi. The flex modulus of each core layer covering the center becomes progressively larger as the layer moves away from the center.

At least one outermost core layer has a specific gravity of greater than 1.25 g/cc, preferably greater than 1.50 g/cc, and most preferably greater than 1.75 g/cc therein increasing the moment of inertia of the overall golf ball and thereby lowering the spin rates. This outermost core layer may be heavily filled with density increasing material while the center and any intermediate core layers may be filled with a density reducing material, preferably greater than 2 g/cc, more preferably greater than 5 g/cc and most preferably greater than 10 g/cc.

The invention provides for a single core layer to serve all the above functions: stiffness greater than the center; and high specific gravity away from the center.

The cover comprises one or more layers of soft material that supplies high partial wedge spin and good durability. This material can be a cast or reaction-injection molded polyurethane, polyurea, polyurethane-ionomer or a thermoplastic such as a thermoplastic urethane, partially or fully neutralized ionomer, metallocene or other single site catalyzed polymer, or blends thereof. The cover will preferably have a Shore D hardness of less than 65 and a thickness of from about 0.010 to 0.100 inches, more preferably from 0.020 to 0.040 inches. Preferably, the cover comprises a single layer.

DESCRIPTION OF THE PREFERRED EMBODIMENTS

Figure 1:
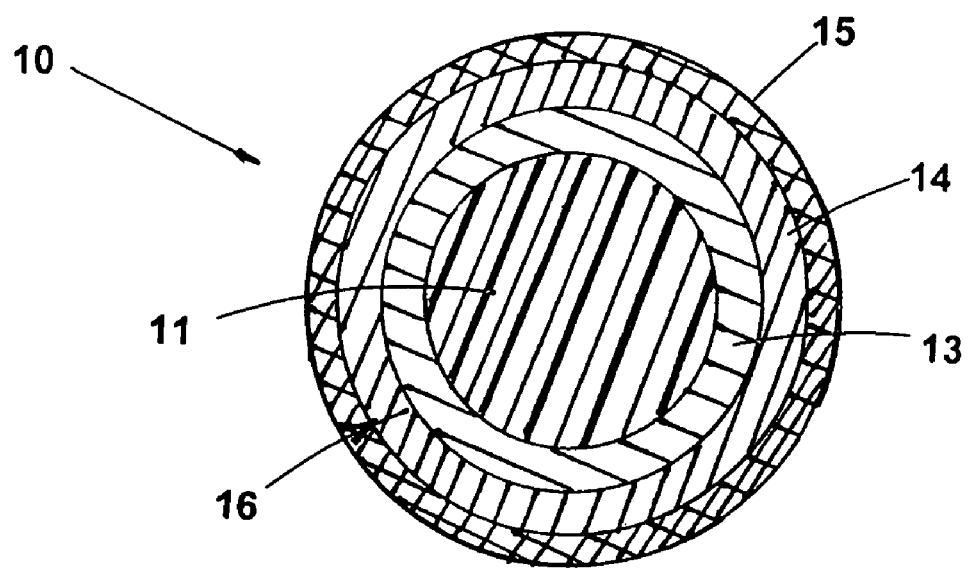
FIG. 1 is a cross-sectional view of a golf ball formed according to the present invention having two outer core layers.
Figure 2:
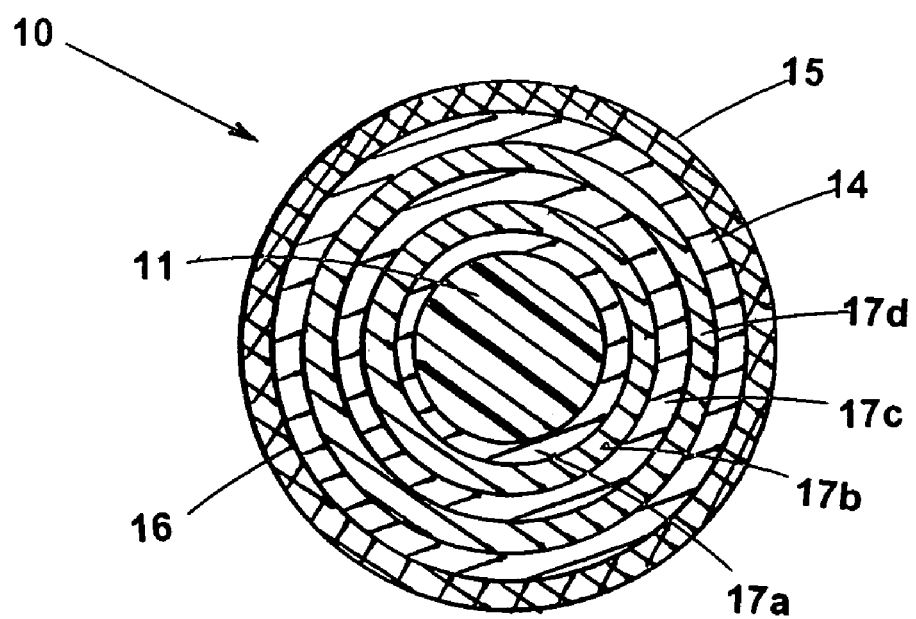
FIG. 2 is a cross-sectional view of a golf ball formed according to the present invention showing five outer core layers.

Referring to FIGS. 1 and 2, golf ball 10 includes a core 16 and a cover 15. Core 16 includes a center 11, and at least one core layer. FIG. 1 depicts an embodiment of the invention having two outer core layers, an intermediate core layer 13 and a relatively rigid outermost core layer 14. However, FIG. 2 describes an embodiment having five core layers.

They are: a first intermediate core layer 17a, a second intermediate core layer 17b, a third intermediate core layer 17c, a fourth intermediate core layer 17d, and a fifth core layer which is generally very rigid, also referred to as the outermost core layer 14.

Referring to FIG. 2, the center 11 is preferably formed by compression molding a sphere from a prep of center material. Compression molding solid centers is well known in the art.

Figure 3:
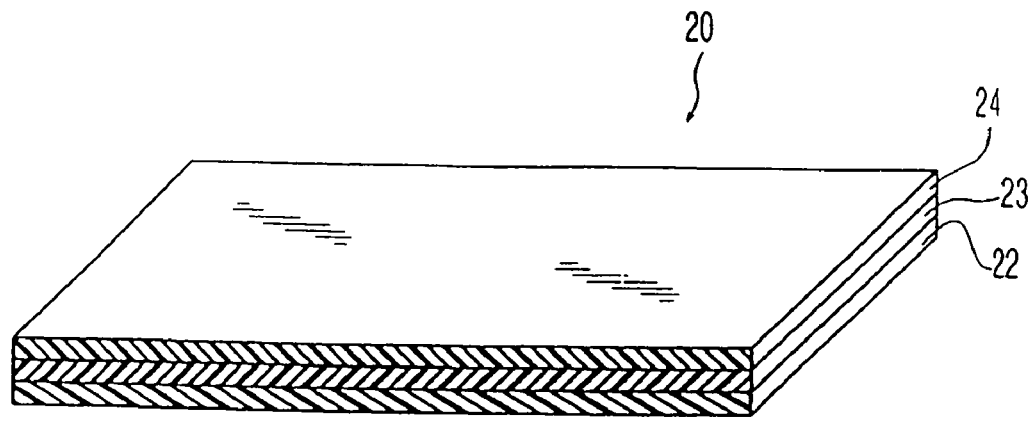
FIG. 3 is a perspective view of a laminate comprising three layers of core material.
Figure 4:
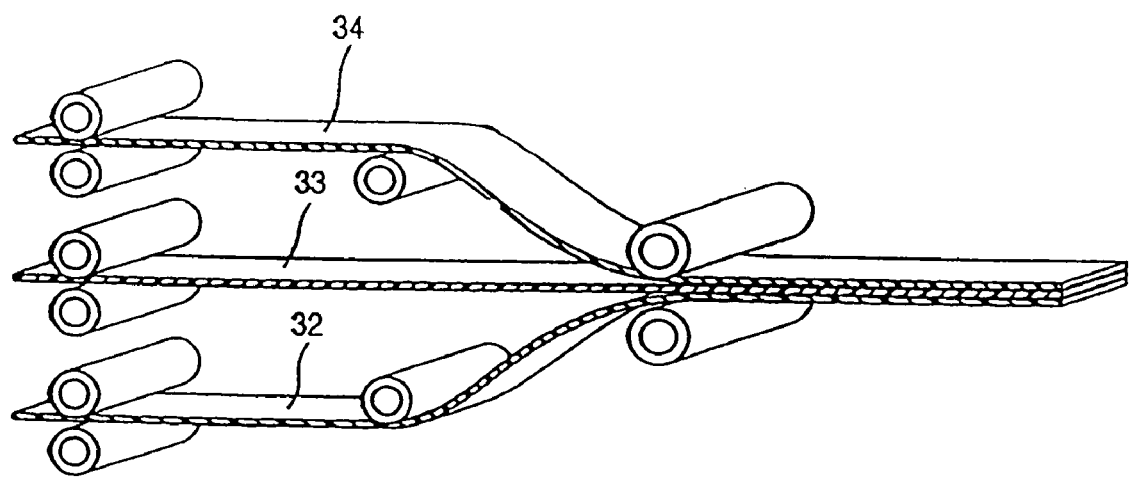
FIG. 4 is a sectional view of rollers and material being formed into the laminate of core material.
Figure 5:
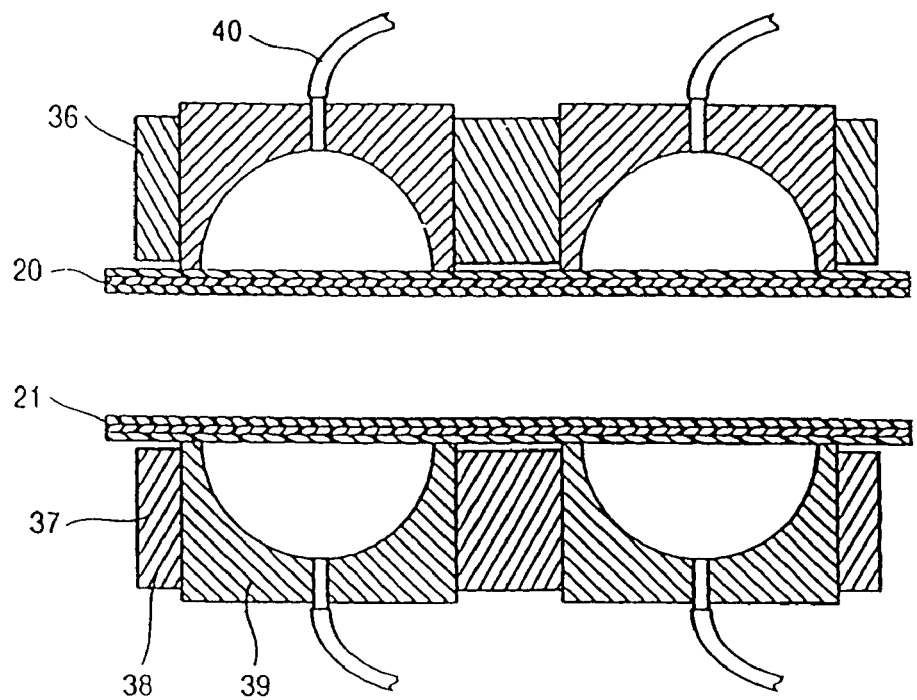
FIG. 5 is a sectional view of a mold for forming multiple layers about a core center according to the present invention.
Figure 6:
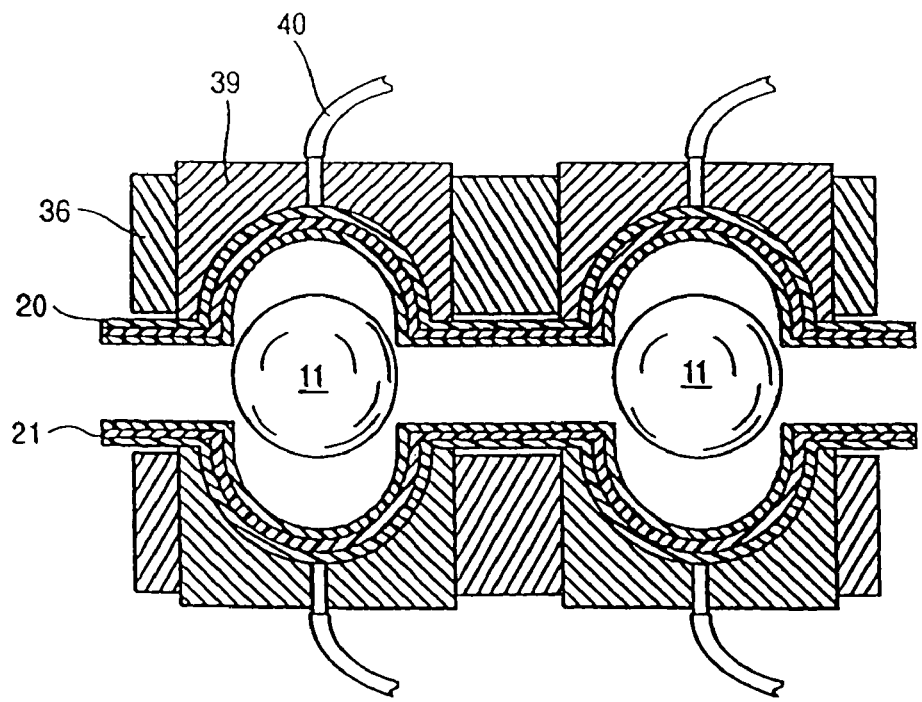
FIG. 6 is a sectional view of a mold forming multiple layers about a core center according to the invention with the mold-forming sheets being vacuum formed within the mold.

Referring to FIGS. 3 and 4, in order to form multiple layers around the center in a first embodiment of the invention, preferably a laminate 20 is formed. The laminate 20 is comprised of at least two layers and preferably three layers 22, 23 and 24. The laminate 20 is formed from the rolling of thin sheets 32, 33, and 34 from a core material. More particularly, each sheet is formed to a thickness that is slightly larger than the thickness of the layers 12,13 and 14 in the finished golf ball 10. The thickness of each may be varied, but all have a thickness preferably of about 0.010 to about 0.100 inches and more preferably from about 0.015 to 0.050 inches thick.

Preferably, the sheets 32, 33, 34 are prepared by mixing the uncured core material to be used for each layer and calendar rolling the material into sheets. The sheets are stacked together to form the laminate 20 having three layers 22, 23 and 24 using calendar rolling mills. The sheets could also be made by extrusion. The sheets 32, 33 and 34 should have very uniform thickness i.e. the thickness of each sheet should not vary more than about 0.005 inch.

In an alternate embodiment, the laminate 20 can be further constructed using an adhesive between each layer of material. Preferably, an epoxy resin such as Epoxy Resin #1028 from RBC Industries in Warwick, R.I. is used. The adhesive should have good shear and tensile strength and, preferably the adhesive should have a tensile strength over about 1500 psi. Still further, the adhesive should not become brittle when cured. An adhesive having a Shore D hardness of less than 60 when cured is preferred. The adhesive layer applied to the sheets should be very thin and preferably, less than about 0.004 inch thick.

Referring to FIGS. 5 through 8, the next step in the method of the present invention is to form multiple layers around the center. This is preferably accomplished by placing the two laminates 20 and 21 in between a top mold 36 and a bottom mold 37. The molds 36 and 37 are comprised of mold frames 38 and replaceable mold halves 39 such as that described in U.S. Pat. No. 4,508,309 issued to Brown. The laminates 20 and 21 are formed to the cavities in the mold halves 39. Preferably, the laminates are suction formed by using a vacuum source 40. The vacuum source 40 suction forms the laminates 20 and 21 to the half mold cavities 39 so that uniformity in layer thickness is maintained. Centers 11 are inserted between the laminates after the laminates 20 and 21 have been formed to the cavities and the laminates 20 and 21 are compression molded about the centers 11 under conditions of temperature and, pressure that are well known in the art.

Figure 7:
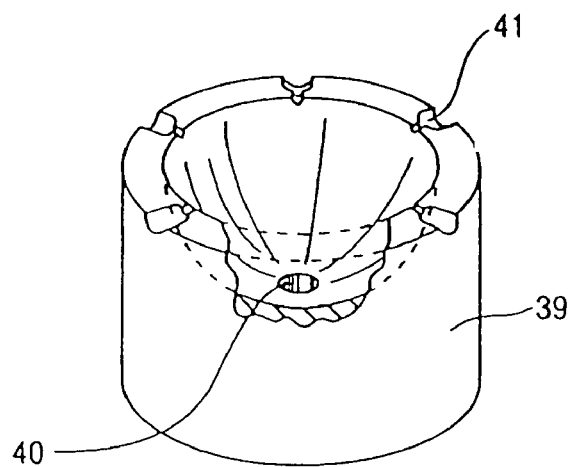
FIG. 7 is a perspective view of a half mold used in forming multiple layers about core centers in accordance with the present invention.
Figure 8:
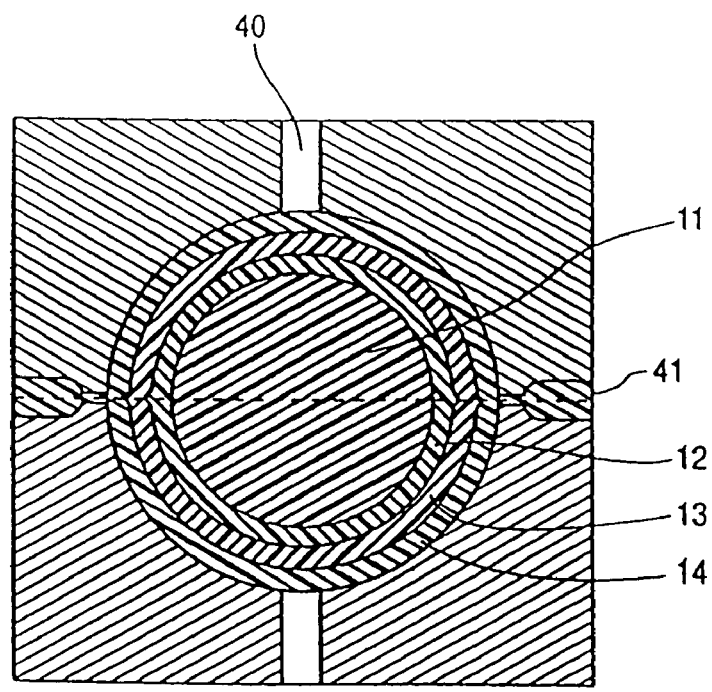
FIG. 8 is a cross-sectional view of a compression mold of a golf ball core according to the present invention.
Figure 9:
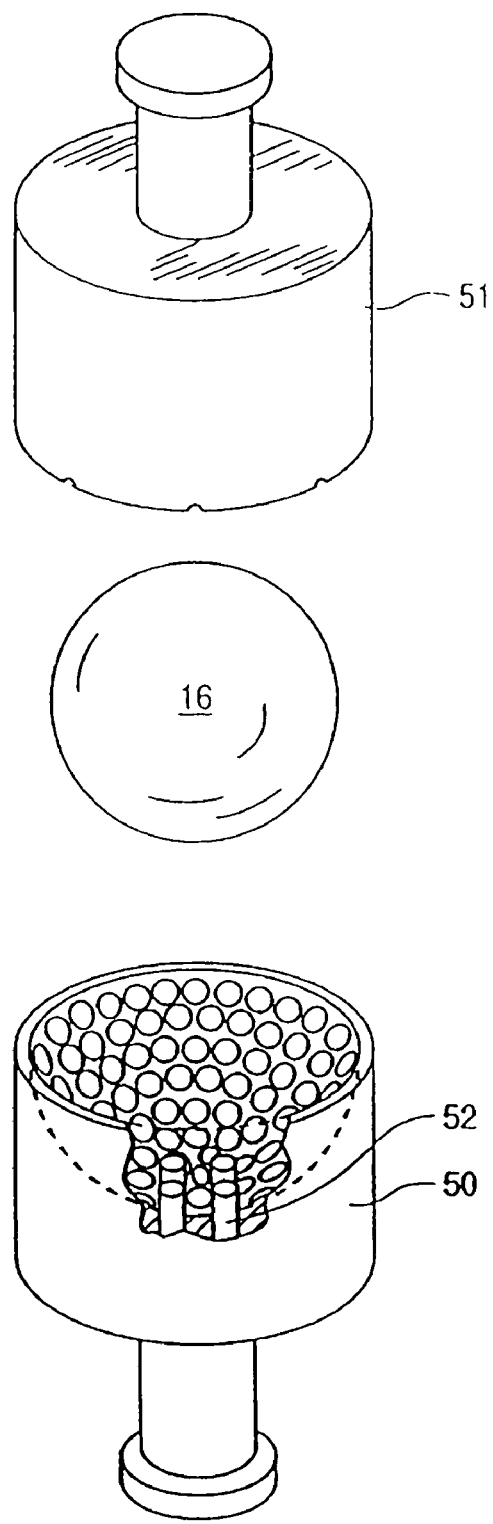
FIG. 9 is an exploded view of a golf ball core according to the present invention in a retractable-pin injection mold.

Referring to FIGS. 7 and 8, the half molds 39 have a plurality of vents 41. The compression molding step includes flowing excess layer material from the laminates 20 and 21 through at least three vents 41 so that the flow of laminate material is symmetrical about the center 11 and the center 11 does not shift due to lateral flow patterns. Preferably, the half molds 39 have 4 to 6 vents.

Referring to FIGS. 9 through 12, the next step in the present invention is to form a cover 15 around the core 16. The core 16, comprised of center 11 and outer layers 12, 13 and 14, is supported within a pair of cover mold-halves 50 and 51 by a plurality of retractable pins 52. The retractable pins 52 are actuated by conventional means well known to those of ordinary skill in the art of mold design.

After the mold-halves 50 and 51 are closed together with the pins 52 supporting the core 16, the cover material is injected into the mold in a liquid state through a plurality of injection ports or gates 49. Gates 49 can be edge gates or sub-gates. With edge gates, the resultant golf balls are all interconnected and may be removed from the mold-halves 50 and 51 together in a large matrix. Sub-gating automatically separates the mold runner from the golf balls during the ejection of the golf balls from mold-halves 50 and 51.

Figure 10:
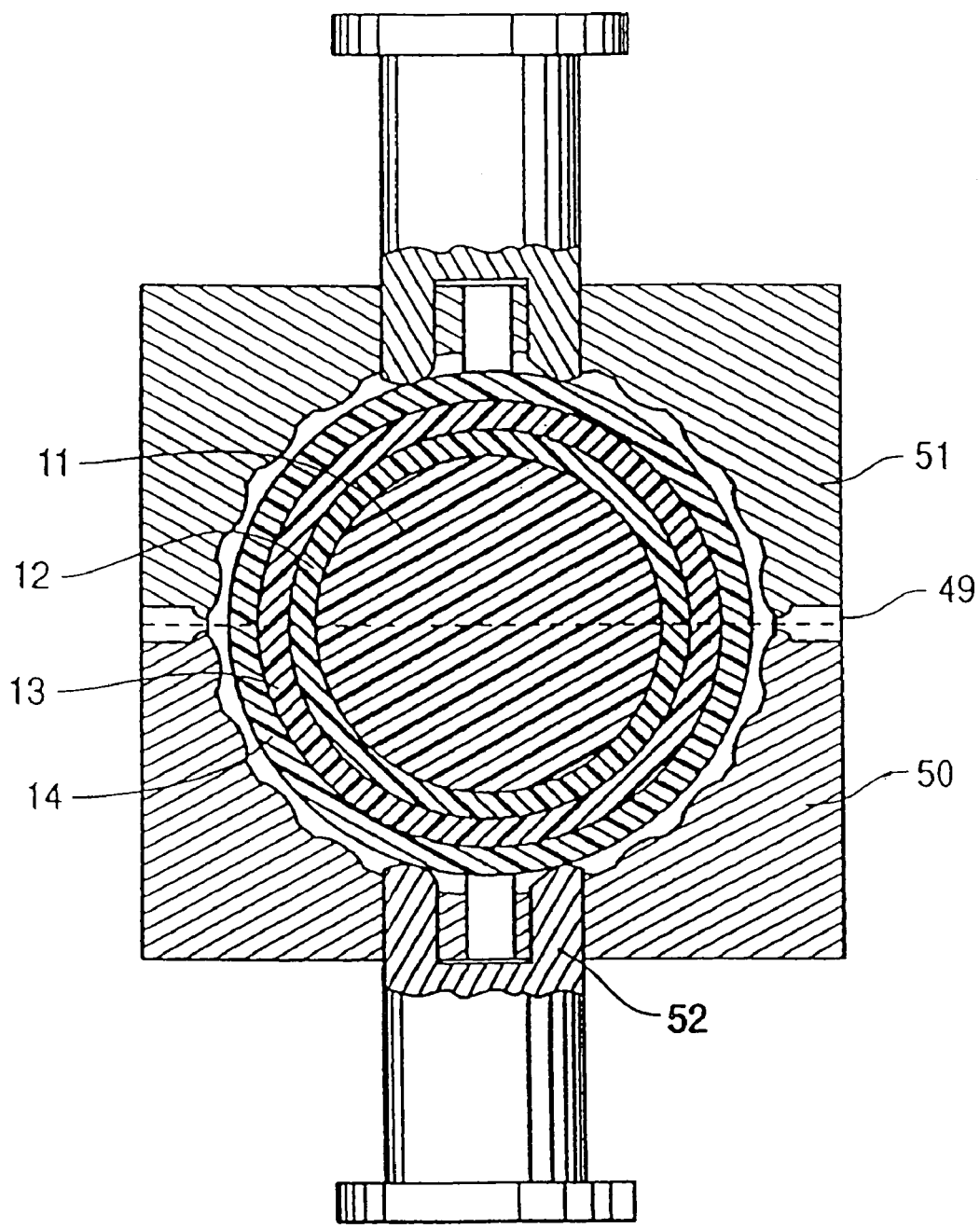
FIG. 10 is a cross-sectional view of a golf ball core according to the present invention in a retractable-pin injection mold.
Figure 11:
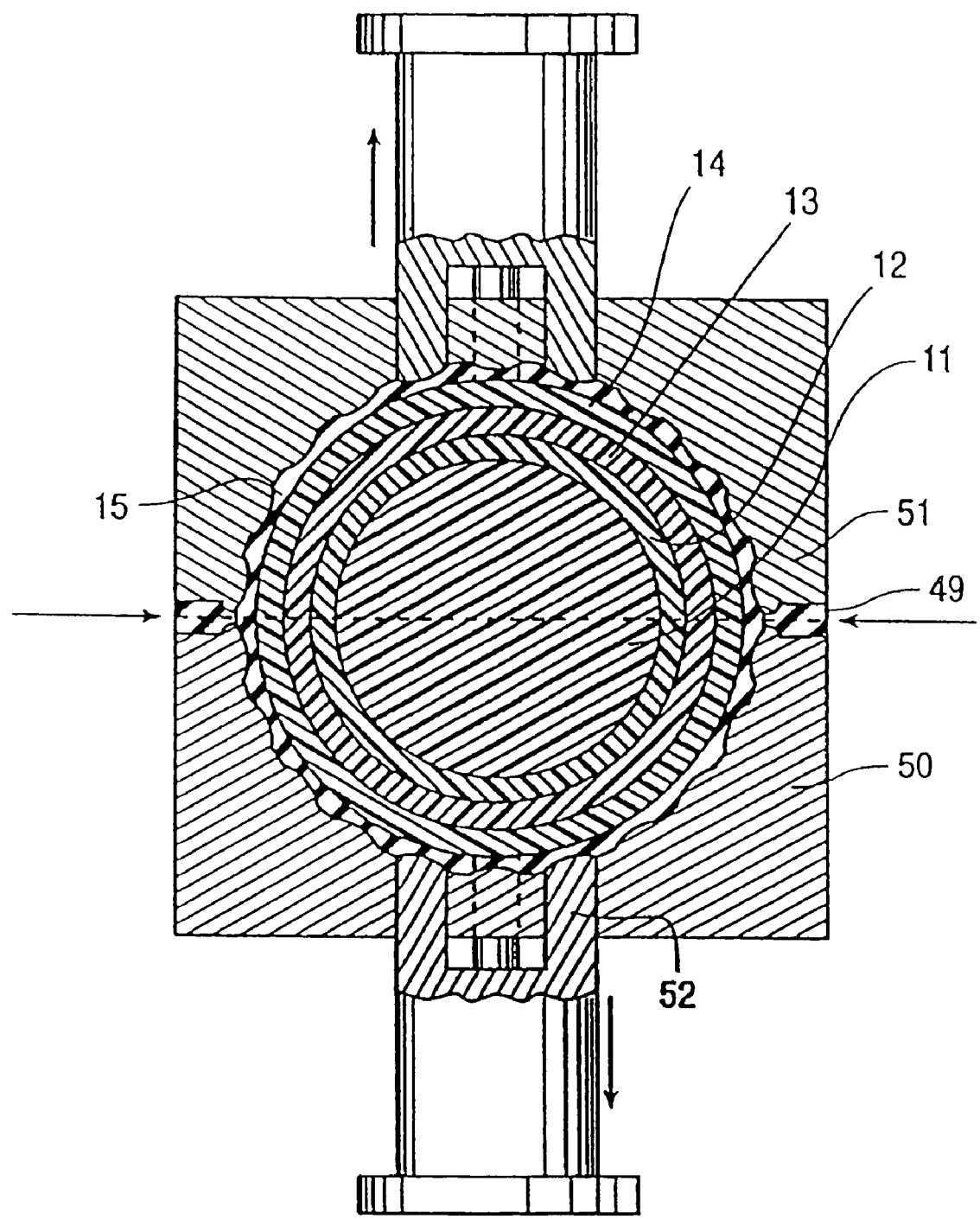
FIG. 11 is a cross-sectional view of a golf ball according to the present invention in a retractable-pin mold.

Referring to FIGS. 10 and 11, retractable pins 52 are retracted after a predetermined amount of cover material has been injected into the mold-halves 50 and 51. The predetermined amount of cover material is substantially all of the material to be injected. Thus, the core 16 is substantially surrounded by cover material and does not shift when the retractable pins 52 are removed. This allows the liquid cover material to flow and substantially fill the cavity between the core 16 and the mold-halves 50 and 51. At the same time, concentricity is maintained between the core 16 and the mold-halves 50 and 51.

The cover material is allowed to solidify around the core 16, thereby forming cover 15. Golf ball 10 is then ejected from mold-halves 50 and 51, and finished using processes which are well known in the art. The temperatures and curing time for mold-halves 50 and 51 are generally known in the art and are dependent on the material that is being used for cover 15, which will be discussed in more detail below.

Figure 12:
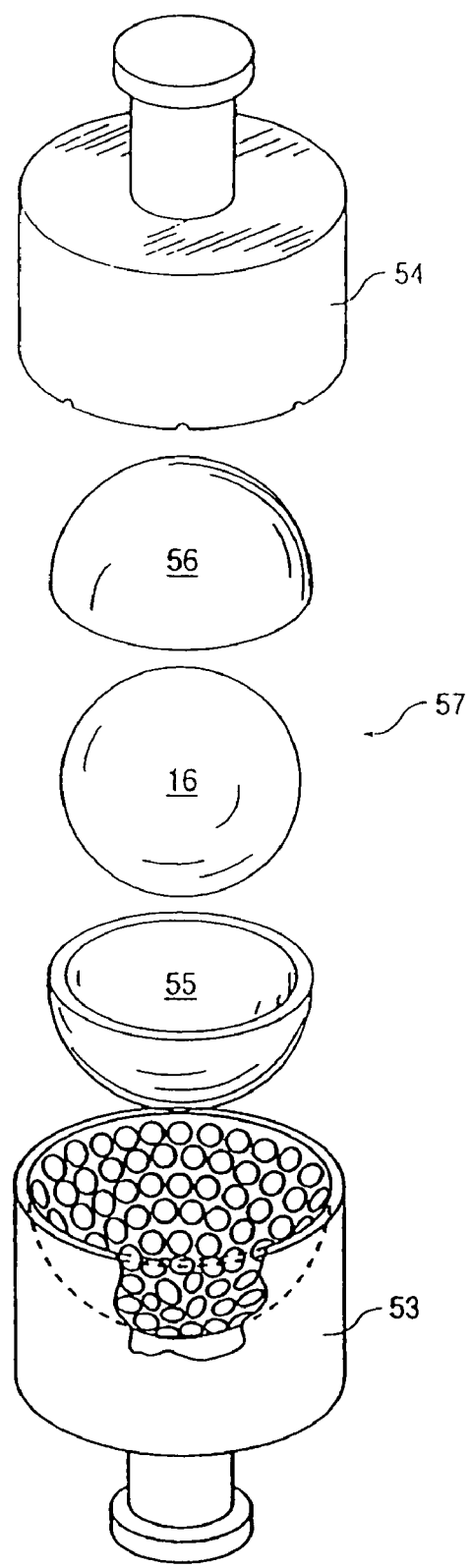
FIG. 12 is an exploded view of a golf ball core according to the present invention with cover layer hemispheres in a compression mold.

Referring to FIG. 12, an alternative method of forming the cover 15 according to the invention is shown. Two cover layer hemispheres 55 and 56 are pre-formed of the desired cover material, preferably, by an injection molding process. The hemispheres 55 and 56 are positioned around core 16 thereby forming an assembly 57 that is then placed into a compression mold 58, which comprises two compression mold-halves 53 and 54. Mold-halves 53 and 54 are advanced toward each other until their mating surfaces touch, and the mold 58 is heated to melt the hemispheres. Mold-halves 53 and 54 compress and heat the hemispheres 55 and 56 about the core 16 to mold the cover material thereto.

Referring back to FIGS. 1–2, the overall diameter of the core 16 is greater than about 1.50 inches, preferably greater than 1.58 inches and most preferably greater than about 1.60 inches. The center 11 has a Shore C surface hardness of less than about 85, preferably less than about 80. The center 11 has a compression of less than about 90, preferably less than about 80 and most preferably less than about 70, and additionally has a COR value greater than about 0.700, preferably greater than about 0.750, and most preferably greater than about 0.800.

One conventional technique for measuring CoR uses a golf ball or golf ball subassembly, air cannon, and a stationary vertical steel plate. The steel plate provides an impact surface weighing about 100 pounds or about 45 kilograms. A pair of ballistic light screens, which measure ball velocity, are spaced apart and located between the air cannon and the steel plate. The ball is fired from the air cannon toward the steel plate over a range of test velocities from 50 ft/s to 180 ft/sec. Unless noted otherwise, all COR data presented in this application are measured using a speed of 125 ft/sec. As the ball travels toward the steel plate, it activates each light screen so that the time at each light screen is measured. This provides an incoming time period proportional to the ball's incoming velocity. The ball impacts the steel plate and rebounds though the light screens, which again measure the time period required to transit between the light screens. This provides an outgoing transit time period proportional to the ball's outgoing velocity. The coefficient of restitution can be calculated by the ratio of the outgoing transit time period to the incoming transit time period.

Another CoR measuring method uses a substantially fixed titanium disk. The titanium disk intending to simulate a golf club is circular, and has a diameter of about 4 inches, and has a mass of about 200 grams. The impact face of the titanium disk may also be flexible and has its own coefficient of restitution, as discussed further below. The disk is mounted on an X-Y-Z table so that its position can be adjusted relative to the launching device prior to testing. A pair of ballistic light screens are spaced apart and located between the launching device and the titanium disk. The ball is fired from the launching device toward the titanium disk at a predetermined test velocity. As the ball travels toward the titanium disk, it activates each light screen so that the time period to transit between the light screens is measured. This provides an incoming transit time period proportional to the ball's incoming velocity. The ball impacts the titanium disk, and rebounds through the light screens which measure the time period to transit between the light screens. This provides an outgoing transit time period proportional to the ball's outgoing velocity. The CoR can be calculated by the ratio of the outgoing time difference to the incoming time difference.

Compression is measured by applying a spring-loaded force to the golf ball center, golf ball core or the golf ball to be examined, with a manual instrument (an "Atti gauge") manufactured by the Atti Engineering Company of Union City, N.J. This machine, equipped with a Federal Dial Gauge, Model D81-C, employs a calibrated spring under a known load. The sphere to be tested is forced a distance of 0.2 inch against this spring. If the spring, in turn, compresses 0.2 inch, the compression is rated at 100; if the spring compresses 0.1 inch, the compression value is rated as 0. Thus more compressible, softer materials will have a lower Atti gauge values than harder, less compressible materials. Compression measured with this instrument is also referred to as PGA compression. The center 11 may be a thermoset composition such as high cis or trans polybutadiene or may may comprise a thermoset or thermoplastic metallocene (or other single site catalyzed polyolefin) such as a polybutadiene, polyethylene copolymer, or EPR or EPDM. In the case of metallocenes, the polymer may be cross-linked with a free radical source such as peroxide or by high-energy radiation. It is highly desirable that the center 11 be soft and fast. The diameter of the center 11 is not critical but since a thin outer core layer(s) is desirable it should be greater than about 1.00 inch and may be much higher, up to an outer diameter of about 1.62 inches.

The enclosing two or more core layers of FIG. 1, may comprise the same materials or even different compositions as disclosed above for the center 11, but at least one core layer must be significantly stiffer and harder than the center 11. At least one of the layers 12–14 has a Shore C hardness of greater than 80 and preferably greater than 85 with a flex modulus (per ASTM D-6272-98 measured about two weeks after the sample is molded) of greater than about 20,000 psi, and preferably greater than about 30,000 psi. Additionally, at least one core layer, 12–14, has a specific gravity of greater than 1.25 g/cc, preferably greater than 1.50 g/cc and most preferably greater than 1.75 g/cc. This will increase the moment of inertia of the overall ball, and subsequently lower spin rates when a driver golf club is used. This may be coupled with the use of unfilled or even foamed density reducing material to reduce specific gravity of the center 11 and any inner core laminate layers 12–13 to further increase the moment of inertia of the ball. Each outer core layer 12–14 has a thickness of from 0.001 to 0.100 inches and preferably from about 0.015 to 0.050 inches. Optionally, one or more layers 12–14 may serve as moisture barrier layers that will protect against reduced COR values, due to moisture take-up by the center 11. The use of moisture barriers is described in U.S. Pat. No. 6,632,147, which is incorporated by reference herein in its entirety. FIG. 1 further describes an embodiment of the invention wherein a single layer 14 serves one or more of the functions described above, i.e. stiffness, high specific gravity, and moisture barrier. More specifically, one or more layers 12–14 having a moisture vapor transmission rate that is less than that of the cover.

The cover 15 comprises one or more layers of a relatively soft material that supplies high partial spin to the ball when struck by a wedge club. Preferably, the cover 15 comprises a single layer. The cover 15 should have good durability as provided by cast polyurethane, polyurea, polyurethane ionomer, or a thermoplastic such as a thermoplastic urethane, ionomer blend, fusabond, etc. It should have a Shore D hardness or less than 65, preferably less than 60, and preferably have a thickness of from about 0.010 to 0.055 inches, more preferably from about 0.020 to 0.040 inches. While multi-layered covers may be employed to fine tune spin and feel, the present invention does not require them to provide optimal performance.

In accordance with an embodiment of the present invention (herein referred to as example 1 as shown in FIG. 1), the center 11 has a diameter of 1.60 inches, a shore C hardness of about 80, a compression of 85 and a COR greater than 0.810. It also has a specific gravity of about 0.97 g/cc. Center 11 is enclosed by two core layers, an intermediate core layer 13 and an outermost core layer 14. The outermost core layer 14 having a Shore C hardness of 80 or greater, a thickness of 0.020 inches, and a tungsten filler such that the core layer 14 will have a specific gravity of greater than 1.3 g/cc. The cover 15 is of a material such as cast polyurethane and having a hardness of less than 65D and a thickness of 0.020 inches. The overall ball 10 has a COR value of greater than 0.800, preferably greater than 0.805 and a compression of less than 100, preferably less than 90. The outermost core layer 14 can function as a moisture barrier. It has a moisture vapor transmission rate less than that of the cover layer and more preferably similar to the moisture vapor transmission rate of an ionomer resin such as Surlyn®, which is in the range of about 0.45 to about 0.95 grams per mm/m$^2$ per day. The moisture vapor transmission rate is defined as: the mass of moisture vapor that diffuses into a material of a given thickness per unit area per unit time. The preferred standards of measuring the moisture vapor transmission rate include: ASTM F1249-90 entitled "Standard Test Method for Water Vapor Transmission Rate Through Plastic Film and Sheeting Using a Modulated Infrared Sensor," and ASTM F372-99 entitled "Standard Test Method for Water Vapor Transmission Rate of Flexible Barrier Materials Using an Infrared Detection Technique," among others.

In another embodiment (herein referred to as example 2 as shown in FIG. 2), the center 11 is the same as in example 1 with the exception that the size of its diameter is about 1.50 inches in stead of about 1.60 inches. Center 11 is enclosed with four intermediate layers 17a, 17b, 17c, and 17d, and a rigid outermost core layer 14. Any of the core layers may function as a moisture barrier. The outermost core layer 14 is generally rigid and has a Shore C hardness of 85 or greater, a thickness of about 0.025 inches and a specific gravity of about 1.25 g/cc, more preferably 1.50, and most preferably about 1.75 g/cc. The outermost core layer 14 has a thickness between about 0.001 inches to about 0.1 inches. The cover 15 has a hardness of less than about 60D and a thickness between about 0.01 inches to about 0.55 inches. The flex modulus of the center 11 is less than 30,000 psi and the flex modulus levels of the intermediate layers 17*a*, 17*b*, 17*c*, 17*d*, and the outermost core layer 14 progressively increases with the outermost core layer being greater than 30,000 psi and preferably greater than 40,000 psi. The core layers each are in a thickness range from about 0.001 inches to about 0.10 inches. Whereas, there may be embodiments wherein the rigid qualities of the outermost core 14 also appear in one of the inner intermediate layers 17*a*, 17*b*, or 17*c*, the rigidity of the outermost core 14 is necessary to the overall desired performance of the ball 10.

The above two examples are an improvement over the golf ball constructions of either U.S. patent application Ser. No. 09/948,692 or U.S. Pat. No. 6,494,795. The manipulation of moment of inertia via the filling (or foaming or otherwise reducing specific gravity) of the center 11 and inner laminate layers 12–14 provide the opportunity to further improve upon distance and spin. The low specific gravity center 11 or layers 12 or 13 can be made from a number of suitable materials, so long as the low specific gravity contributes to the soft compression and resilience of the golf ball. The material can be from a thermosetting syntactic foam with hollow sphere fillers or microspheres in a polymeric matrix of epoxy, urethane, polyester or any suitable thermosetting binder, where the cured composition has a specific gravity less than 1.1 g/cc and preferably less than 1.0 g/cc. Additionally, any number of foamed or otherwise specific gravity reduced thermoplastic or thermosetting polymer compositions may also be used such as metallocene-catalyzed polymers and blends thereof described in U.S. Pat. Nos. 5,824,746 and 6,025,442 which are incorporated by reference herein in their entirety. Further, a thermoset polyurethane composition having a specific gravity or less than 1.0 g/cc such as a nucleated reaction injection molded or cast polyurethane may be used. Such a composition may result in a gas-filled or cellular solid layer.

As discussed in U.S. Pat. No. 5,971,870, which is incorporated by reference herein in its entirety, fillers may be or are typically in a finely divided form. For example, in a size generally less than about 20 mesh, preferably less than about 100 mesh U.S. standard size, except for fibers and flock, which are generally elongated, flock and fiber sizes should be small enough to facilitate processing. Filler particle size will depend upon desired effect, cost, ease of addition, and dusting considerations. The filler preferably is selected from the group consisting of precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, carbonates, metals, metal alloys, tungsten carbide, metal oxides, metal stearates, particulate carbonaceous materials, micro balloons, and combinations thereof. Non-limiting examples of suitable fillers, their densities, and their preferred uses are as follows:

| Filler Type | Sp. Gr. | Comments |
|---|---|---|
| Precipitated hydrated silica | 2.0 | 1, 2 |
| Clay | 2.62 | 1, 2 |
| Talc | 2.85 | 1, 2 |
| Asbestos | 2.5 | 1, 2 |
| Glass fibers | 2.55 | 1, 2 |
| Aramid fibers (KEVLAR ®) | 1.44 | 1, 2 |
| Mica | 2.8 | 1, 2 |
| Calcium metasilicate | 2.9 | 1, 2 |
| Barium sulfate | 4.6 | 1, 2 |
| Zinc sulfide | 4.1 | 1, 2 |
| Lithopone | 4.2–4.3 | 1, 2 |
| Silicates | 2.1 | 1, 2 |
| Silicon carbide patelets | 3.18 | 1, 2 |
| Silicon carbide whiskers | 3.2 | 1, 2 |
| Tungsten carbide | 15.6 | 1 |
| Tungsten oxide | 5.8 | 1 |
| Diatomaceous earth | 2.3 | 1, 2 |
| Polyvinyl chloride | 1.41 | 1, 2 |
| Carbonates | | |
| Calcium carbonate | 2.71 | 1, 2 |
| Magnesium carbonate | 2.20 | 1, 2 |
| Metals and Alloys (powders) | | |
| Titanium | 4.51 | 1 |
| Tungsten | 19.35 | 1 |
| Aluminum | 2.70 | 1 |
| Bismuth | 9.78 | 1 |
| Nickel | 8.90 | 1 |
| Molybdenum | 10.2 | 1 |
| Iron | 7.86 | 1 |
| Steel | 7.8–7.9 | 1 |
| Lead | 11.4 | 1, 2 |
| Copper | 8.94 | 1 |
| Brass | 8.2–8.4 | 1 |
| Boron | 2.34 | 1 |
| Boron carbide whiskers | 2.52 | 1, 2 |
| Bronze | 8.70–8.74 | 1 |
| Cobalt | 8.92 | 1 |
| Beryllium | 1.84 | 1 |
| Zinc | 7.14 | 1 |
| Tin | 7.31 | 1 |
| Metal Oxides | | |
| Zinc oxide | 5.57 | 1, 2 |
| Iron oxide | 5.1 | 1, 2 |
| Aluminum oxide | 4.0 | |
| Titanium oxide | 3.9–4.1 | 1, 2 |
| Magnesium oxide | 3.3–3.5 | 1, 2 |
| Zirconium oxide | 5.73 | |
| Metal Stearates | | |
| Zinc stearate | 1.09 | 3, 4 |
| Calcium stearate | 1.03 | 3, 4 |
| Barium stearate | 1.23 | 3, 4 |
| Lithium stearate | 1.01 | 3, 4 |
| Magnesium stearate | 1.03 | 3, 4 |
| Particulate carbonaceous materials | | |
| Graphite | 1.5–1.8 | 1, 2 |
| Carbon black | 1.8 | 1, 2 |
| Natural bitumen | 1.2–1.4 | 1, 2 |
| Cotton flock | 1.3–1.4 | 1, 2 |
| Cellulose flock | 1.15–1.5 | 1, 2 |
| Leather fiber | 1.2–1.4 | 1, 2 |
| Micro balloons | | |
| Glass | 0.15–1.1 | 1, 2 |
| Ceramic | 0.2–0.7 | 1, 2 |
| Fly ash | 0.6–0.8 | 1, 2 |

-continued

| Filler Type | Sp. Gr. | Comments |
| --- | --- | --- |
| Coupling Agents Adhesion Promoters | | |
| Titanates | 0.95–1.11 | |
| Zirconates | 0.92–1.11 | |
| Silane | 0.95–1.2 | |

1 Particularly useful for adjusting density of the inner cover layer.
2 Particularly useful for adjusting flex modulus of the inner cover layer.
3 Particularly useful for adjusting mold release of the inner cover layer.
4 Particularly useful for increasing melt flow index of the inner cover layer.

The increased hardness of the intermediate core layer 13 in reference to the innermost core layer 12 and the outermost core layer 14 provides the ball 10 with performance characteristics that have been associated primarily with dual cover layer golf balls using ionomer inner cover layers.

Examining a golf ball made with a small center of 1 inch or less and relatively thick core layers, each having a thickness of greater than 0.1 inch, it will be seen that this structure decreases ball initial velocity and reduces the ball spin rate effects. When impacting a golf ball with different clubs within a set, the impact speed and the impact angle are changed. On an average, for a tour professional the impact speed of a driver is about 110 miles an hour. The average professional hitting a 5 iron will have an impact speed of about 90 miles an hour and the wedge impact velocity is less than about 80 miles an hour. Moreover, the force on the golf ball is broken up into two components, the normal force that is normal to the club face and the tangential force that is parallel to the club face. Since most professionals use a driver having a loft of about 10 degrees, the tangential force is significantly less than the normal force. However, when using a wedge having a loft between 48 and 60 degrees, the tangential force becomes very significant. For example, experimental data shows that with a clubhead having an impact velocity of about 95 miles an hour and an angle of 20 degrees, a two piece ball has a maximum deflection of about 0.151 inches. When hit with a club head at 95 miles an hour and an impact angle of 40 degrees, the ball has a maximum deflection of about 0.128 inches or a difference of 0.023 inches. Thus, the impact deflection depends significantly on the impact angle, and by having outer layers of less than 0.1 inch, the spin characteristics of the ball is altered for different clubs within a set as discussed in more detail below. Golf balls can be made for all types of golfers, by properly utilizing the hardness and density of the center, core layers and cover material. By creating a golf ball core with relatively thin outer layers that progressively get harder, the spin rate of the ball is surprisingly good for a player that desires a high spin rate golf ball. More particularly, when this type of player hits the ball with a short iron, only the outer layer and cover affect the spin rate of the ball. By incorporating a very hard core outer layer and a soft cover, the spin rate is maximized for the short iron shot such as a wedge having an angle of about 48 to 60 degrees. In order to reduce the spin rate a little for middle iron shots such as a 6 iron having a oft of about 32 degrees to make sure that sufficient distance is obtained, the second layer is softer than the third layer. Similarly, to decrease the spin rate, provide good distance and a good trajectory for long irons such s a 3 iron having a loft of about 20 degrees, the first layer is softer than the second layer. Finally, for a low spin rate with the driver having a loft of about 8 to 12 degrees, the center is made very soft.

Table 1 sets forth the contents that can make-up the golf ball core in the first embodiment. The compositions used to prepare the golf ball core of this embodiment are all in parts per hundred (pph), based on 100 parts of polybutadiene. The fillers used in the compositions of these examples are regrind and barium sulfate (BaSO$_4$). Vulcup 40KE™, and Varox 231XL™, are free radical initiators, and are a-a bis (t-butylperoxy) diisopropylbenzene and 1,1-di(t-butylperoxy) 3,3,5-trimethyl cyclohexane, respectively.

TABLE 1

CORE COMPOSITIONS (pph)

| | Layer No. | | | |
| --- | --- | --- | --- | --- |
| | Center | 1 | 2 | 3 |
| Polybutadiene | 100 | 100 | 100 | 100 |
| Polywate 325 | 26 | 23 | 18 | 13 |
| Vulcup 40KE ™ | 0.3 | .3 | .3 | .3 |
| Varox 231XL ™ | 0.6 | .5 | .5 | .5 |
| BaSO.sub.4 | 31 | 26 | 25 | 25 |
| Zinc Diacrylate | 30 | 32 | 35 | 47 |
| SR-350 | 2 | 2 | 2 | 6 |
| Calcium Oxide | 3 | 0 | 0 | 0 |
| Zinc Oxide | 0 | 3 | 6 | 6 |

All the ingredients except the peroxides were mixed in a Process Lab Brabender mixer to about 180–200° F. Peroxides were added in the second stage to the initial mixture, and the resulting mixture was removed from the Brabender and blended on a lab mill to insure homogeneity. After mixing, the mixture was then hand rolled using a laboratory mill and cut into pieces or "preps". To make the core centers 11 the preps were then compression molded at about 160° C. for about 15 minutes. To fabricate the outer layers, polybutadiene rubber material was rolled into flat sheets and the sheets were stacked to form a laminate. The laminate was then compression molded around the centers as described above. To form the finished golf balls, the cores were ground and inserted into two cover hemispheres of materials that were suitable for use in a cover layer. These may include any number of partially or fully neutralized ionomers such as those disclosed in the parent application, or described in WO 00/23519, WO 01/29129. Also any thermosetting or thermoplastic polyurethanes or polyureas, including any aliphatic or aromatic polyether or polyester polyurethanes such as but not limited to those disclosed in U.S. Pat. Nos. 6,476,176, 6,309,313; 6,210,294; 6,117,024; 5,908,358; 5,929,189; and 5,334,673. Additionally, other suitable cover materials are disclosed in U.S. Pat. No. 5,919,100 and also in any of the co-pending applications referenced herein.

Referring back to the core layers 12, 13 and 14, these can be made of thermosetting or thermoplastic materials. For example, the first, second and third layers 12, 13 and 14 can be formed from thermoplastic elastomers, functionalized styrene-butadiene elastomers, thermoplastic rubbers, thermoset elastomers, thermoplastic urethanes, metallocene polymers, urethanes, or ionomer resins, or blends thereof.

The thermoplastic elastomers include dynamically vulcanized thermoplastic elastomers and blends thereof. Suitable dynamically vulcanized thermoplastic elastomers include Santoprene®., Sarlink®, Vyram®, Dytron® and Vistaflex®. Santoprene® is the trademark for a dynamically vulcanized PP/EPDM. Santoprene® 203-40 is an example of a preferred Santoprene® and is commercially available from Advanced Elastomer Systems.

Examples of suitable functionalized styrene-butadiene elastomers include Kraton FG-1901x and FG-1921x, available from the Shell Corporation. Examples of suitable thermoplastic polyurethanes include Estane® 58133, Estane® 58134 and Estane® 58144, which are available from the B.F. Goodrich Company. Further, the materials for the first, second and third layers 12, 13 and 14 described above may be in the form of a foamed polymeric material. For example, suitable metallocene polymers include foams of thermoplastic elastomers based on metallocene single-site catalyst-based foams. Such metallocene-based foams are commercially available from Sentinel Products of Hyannis, Mass.

Suitable thermoplastic polyetheresters include Hytrel® 3078, Hytrel® G3548W, and Hytrel® G4078W which are commercially available from DuPont. Suitable thermoplastic polyetheramides include Pebax® 2533, Pebax® 3533, Pebax® 1205 and Pebax® 4033 which are available from Elf-Atochem. Suitable thermoplastic polyesters include polybutylene terephthalate.

Suitable thermoplastic ionomer resins are obtained by providing a cross metallic bond to polymers of monoolefin with at least one member selected from the group consisting of unsaturated mono- or di-carboxylic acids having 3 to 12 carbon atoms and esters thereof. The polymer contains 1 to 50% by weight of the unsaturated mono- or di-carboxylic acid and/or ester thereof. More particularly, low modulus ionomers, such as acid-containing ethylene copolymer ionomers, include E/X/Y copolymers where E is ethylene, X is a softening co-monomer such as acrylate or methacrylate present in 0–50 (preferably 0–25, most preferably 0–2), weight percent of the polymer, and Y is acrylic or methacrylic acid present in 5–35 (preferably 10–35, most preferably 15–35, making the ionomer a high acid ionomer) weight percent of the polymer, wherein the acid moiety is neutralized 1–100% (preferably at least 40%, most preferably at least about 60%) to form an ionomer by a cation such as lithium*, sodium*, potassium, magnesium*, calcium, barium, lead, tin, zinc* or aluminum (*=preferred), or a combination of such cations. Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers.

Such ionomer resins include SURLYN®, and Iotek®, which are commercially available from DuPont and Exxon, respectively. Likewise, other conventional materials such as balata, elastomer and polyethylene may also be used in the first, second and third layers 12, 13 and 14.

Such thermoplastic blends comprise about 1% to about 99% by weight of a first thermoplastic and about 99% to about 1% by weight of a second thermoplastic.

Preferably the thermoplastic blend comprises about 5% to about 95% by weight of a first thermoplastic and about 5% to about 95% by weight of a second thermoplastic. In a preferred embodiment of the present invention, the first thermoplastic material of the blend is a dynamically vulcanized thermoplastic elastomer, such as Santoprene®.

The properties such as hardness, Bayshore resilience, modulus, center diameter and layer thickness of the golf balls of the present invention have been found to affect play characteristics such as spin, initial velocity and feel of golf balls.

U.S. application Ser. No. 10/230,015, now U.S. Publication No. 20030114565, and U.S. application Ser. No. 10/108,793, now U.S. Publication No. 20030050373, which is incorporated by reference herein in its entirety, discusses soft, high resilient ionomers, which are preferably from neutralizing the acid copolymer(s) of at least one E/X/Y copolymer, where E is ethylene, X is the .alpha. beta. ethylenically unsaturated carboxylic acid, and Y is a softening co-monomer. X is preferably present in 2–30 (preferably 4–20, most preferably 5–15) wt. % of the polymer, and Y is preferably present in 17–40 (preferably 20–40, and more preferably 24–35) wt. % of the polymer. Preferably, the melt index (MI) of the base resin is at least 20, or at least 40, more preferably, at least 75 and most preferably at least 150. Particular soft, resilient ionomers included in this invention are partially neutralized ethylene/(meth) acrylic acid/butyl (meth) acrylate copolymers having an MI and level of neutralization that results in a melt processible polymer that has useful physical properties. The copolymers are at least partially neutralized. Preferably at least 40, or, more preferably at least 55, even more preferably about 70, and most preferably about 80 of the acid moiety of the acid copolymer is neutralized by one or more alkali metal, transition metal, or alkaline earth metal cations. Cations useful in making the ionomers of this invention comprise lithium, sodium, potassium, magnesium, calcium, barium, or zinc, or a combination of such cations.

The invention also relates to a "modified" soft, resilient thermoplastic ionomer that comprises a melt blend of (a) the acid copolymers or the melt processible ionomers made therefrom as described above and (b) one or more organic acid(s) or salt(s) thereof, wherein greater than 80%, preferably greater than 90% of all the acid of (a) and of (b) is neutralized. Preferably, 100% of all the acid of (a) and (b) is neutralized by a cation source. Preferably, an amount of cation source in excess of the amount required to neutralize 100% of the acid in (a) and (b) is used to neutralize the acid in (a) and (b). Blends with fatty acids or fatty acid salts are preferred.

The organic acids or salts thereof are added in an amount sufficient to enhance the resilience of the copolymer. Preferably, the organic acids or salts thereof are added in an amount sufficient to substantially remove remaining ethylene crystallinity of the copolymer.

Preferably, the organic acids or salts are added in an amount of at least about 5% (weight basis) of the total amount of copolymer and organic acid(s). More preferably, the organic acids or salts thereof are added in an amount of at least about 15%, even more preferably at least about 20%. Preferably, the organic acid(s) are added in an amount up to about 50% (weight basis) based on the total amount of copolymer and organic acid. More preferably, the organic acids or salts thereof are added in an amount of up to about 40%, more preferably, up to about 35%. The non-volatile, non-migratory organic acids preferably are one or more aliphatic, mono-functional organic acids or salts thereof as described below, particularly one or more aliphatic, mono-functional, saturated or unsaturated organic acids having less than 36 carbon atoms or salts of the organic acids, preferably stearic acid or oleic acid. Fatty acids or fatty acid salts are most preferred.

Processes for fatty acid (salt) modifications are known in the art. Particularly, the modified highly-neutralized soft, resilient acid copolymer ionomers of this invention can be produced by:

(a) melt-blending (1) ethylene, .alpha.,.beta. ethylenically unsaturated $C_{3-8}$ carboxylic acid copolymer(s) or melt-processible ionomer(s) thereof that have their crystallinity disrupted by addition of a softening monomer or other means with (2) sufficient non-volatile, non-migratory organic acids to substantially enhance the resilience and to disrupt (preferably remove) the remaining ethylene crystallinity, and then concurrently or subsequently (b) Adding a sufficient amount of a cation source to increase the level of neutralization of all the acid moieties (including those in the acid copolymer and in the organic acid if the non-volatile, non-migratory organic acid is an organic acid) to the desired level.

The weight ratio of X to Y in the composition is at least about 1:20. Preferably, the weight ratio of X to Y is at least about 1:15, more preferably, at least about 1:10. Furthermore, the weight ratio of X to Y is up to about 1:1.67, more preferably up to about 1:2. Most preferably, the weight ratio of X to Y in the composition is up to about 1:2.2.

The acid copolymers used in the present invention to make the ionomers are preferably 'direct' acid copolymers (containing high levels of softening monomers). As noted above, the copolymers are at least partially neutralized, preferably at least about 40% of X in the composition is neutralized. More preferably, at least about 55% of X is neutralized. Even more preferably, at least about 70, and most preferably, at least about 80% of X is neutralized. In the event that the copolymer is highly neutralized (e.g., to at least 45%, preferably 50%, 55%, 70%, or 80%, of acid moiety), the MI of the acid copolymer should be sufficiently high so that the resulting neutralized resin has a measurable MI in accord with ASTM D-1238, condition E, at 190° C., using a 2160 gram weight. Preferably this resulting MI will be at least 0.1, preferably at least 0.5, and more preferably 1.0 or greater. Preferably, for highly neutralized acid copolymer, the MI of the acid copolymer base resin is at least 20, or at least 40, at least 75, and more preferably at least 150.

The acid copolymers preferably comprise alpha olefin, particularly ethylene, $C_{3-8}$ .alpha. .beta. ethylenically unsaturated carboxylic acid, particularly acrylic and methacrylic acid, and softening monomers, selected from alkyl acrylate, and alkyl methacrylate, wherein the alkyl groups have from 1–8 carbon atoms, copolymers. By "softening", it is meant that the crystallinity is disrupted (the polymer is made less crystalline). While the alpha olefin can be a $C_2$-$C_4$ alpha olefin, ethylene is most preferred for use in the present invention. Accordingly, it is described and illustrated herein in terms of ethylene as the alpha olefin.

The acid copolymers, when the alpha olefin is ethylene, can be described as E/X/Y copolymers where E is ethylene, X is the .alpha. beta ethylenically unsaturated carboxylic acid, and Y is a softening co-monomer X is preferably present in 2–30 (preferably 4–20, most preferably 5–15) wt. % of the polymer, and Y is preferably present in 17–40 (preferably 20–40, most preferably 24–35) wt. % of the polymer.

The ethylene-acid copolymers with high levels of acid (X) are difficult to prepare in continuous polymerizers because of monomer-polymer phase separation. This difficulty can be avoided however by use of "co-solvent technology" as described in U.S. Pat. No. 5,028,674, or by employing somewhat higher pressures than those which copolymers with lower acid can be prepared.

Specific acid-copolymers include ethylene/(meth) acrylic acid/n-butyl (meth) acrylate, ethylene/(meth) acrylic acid/iso-butyl (meth) acrylate, ethylene/(meth) acrylic acid/methyl (meth) acrylate, and ethylene/(meth) acrylic acid/ethyl (meth) acrylate terpolymers.

The organic acids employed are aliphatic, mono-functional (saturated, unsaturated, or multi-unsaturated) organic acids, particularly those having fewer than 36 carbon atoms. Also salts of these organic acids may be employed. Fatty acids or fatty acid salts are preferred. The salts may be any of a wide variety, particularly including the barium, lithium, sodium, zinc, bismuth, potassium, strontium, magnesium or calcium salts of the organic acids. Particular organic acids useful in the present invention include caproic acid, caprylic acid, capric acid, lauric acid, stearic acid, behenic acid, erucic acid, oleic acid, and linoleic acid.

The optional filler component is chosen to impart additional density to blends of the previously described components, the selection being dependent upon the different parts (e.g., cover, mantle, core, center, intermediate layers in a multilayered core or ball) and the type of golf ball desired (e.g., one-piece, two-piece, three-piece or multiple-piece ball), as will be more fully detailed below.

Generally, the filler will be inorganic having a density greater than about 4 grams/cubic centimeter (gm/cc), preferably greater than 5 gm/cc, and will be present in amounts between 0 to about 60 wt. % based on the total weight of the composition. Examples of useful fillers include zinc oxide, barium sulfate, lead silicate and tungsten carbide, as well as the other well-known fillers used in golf balls. It is preferred that the filler materials be non-reactive or almost non-reactive and not stiffen or raise the compression nor reduce the coefficient of restitution significantly.

Additional optional additives useful in the practice of the subject invention include acid copolymer wax (e.g., Allied wax AC 143 believed to be an ethylene/16–18% acrylic acid copolymer with a number average molecular weight of 2,040), which assist in preventing reaction between the filler materials (e.g., ZnO) and the acid moiety in the ethylene copolymer. Other optional additives include $TiO_2$, which is used as a whitening agent; optical brighteners; surfactants; processing aids; etc.

Ionomers may be blended with conventional ionomeric copolymers (di-, ter-, etc.), using well-known techniques, to manipulate product properties as desired. The blends would still exhibit lower hardness and higher resilience when compared with blends based on conventional ionomers.

Also, ionomers can be blended with non-ionic thermoplastic resins to manipulate product properties. The non-ionic thermoplastic resins would, by way of non-limiting illustrative examples, include thermoplastic elastomers, such as polyurethane, poly-ether-ester, poly-amide-ether, polyether-urea, PEBAX (a family of block copolymers based on polyether-block-amide, commercially supplied by Atochem), styrene-butadiene-styrene (SBS) block copolymers, styrene(ethylene-butylene)-styrene block copolymers, etc., poly amide (oligomeric and polymeric), polyesters, polyolefins including PE, PP, E/P copolymers, etc., ethylene copolymers with various comonomers, such as vinyl acetate, (meth)acrylates, (meth)acrylic acid, epoxy-functionalized monomer, CO, etc., functionalized polymers with maleic anhydride grafting, epoxidization etc., elastomers, such as EPDM, metallocene catalyzed PE and copolymer, ground up powders of the thermoset elastomers, etc. Such thermoplastic blends comprise about 1% to about 99% by weight of a first thermoplastic and about 99% to about 1% by weight of a second thermoplastic.

Additionally, the compositions of U.S. application Ser. No. 10/269,341, now U.S. Publication No. 20030130434 and U.S. Pat. No. 6,653,382, both of which are incorporated herein in their entirety, discuss compositions having high COR when formed into solid spheres.

The thermoplastic composition of this invention comprises a polymer which, when formed into a sphere that is 1.50 to 1.54 inches in diameter, has a coefficient of restitution (COR) when measured by firing the sphere at an initial velocity of 125 feet/second against a steel plate positioned 3 feet from the point where initial velocity and rebound velocity are determined and by dividing the rebound velocity from the plate by the initial velocity and an Atti compression of no more than 100.

The thermoplastic composition of this invention preferably comprises (a) aliphatic, mono-functional organic acid(s) having fewer than 36 carbon atoms; and (b) ethylene, $C_3$ to $C_8$ $\alpha,\beta$ ethylenically unsaturated carboxylic acid copolymer(s) and ionomer(s) thereof, wherein greater than 90%, preferably near 100%, and more preferably 100% of all the acid of (a) and (b) are neutralized.

The thermopastic composition preferably comprises melt-processible, highly-neutralized (greater than 90%, preferably near 100%, and more preferably 100%) polymer of (1) ethylene, $C_3$ to $C_8$ $\alpha,\beta$ ethylenically unsaturated carboxylic acid copolymers that have their crystallinity disrupted by addition of a softening monomer or other means such as high acid levels, and (2) non-volatile, non-migratory agents such as organic acids (or salts) selected for their ability to substantially or totally suppress any remaining ethylene crystallinity. Agents other than organic acids (or salts) may be used.

It has been found that, by modifying an acid copolymer or ionomer with a sufficient amount of specific organic acids (or salts thereof); it is possible to highly neutralize the acid copolymer without losing processibility or properties such as elongation and toughness. The organic acids employed in the present invention are aliphatic, mono-functional, saturated or unsaturated organic acids, particularly those having fewer than 36 carbon atoms, and particularly those that are non-volatile and non-migratory and exhibit ionic array plasticizing and ethylene crystallinity suppression properties.

With the addition of sufficient organic acid, greater than 90%, nearly 100%, and preferably 100% of the acid moieties in the acid copolymer from which the ionomer is made can be neutralized without losing the processibility and properties of elongation and toughness.

The melt-processible, highly-neutralized acid copolymer ionomer can be produced by the following:

(a) melt-blending (1) ethylene $\alpha,\beta$ ethylenically unsaturated $C_{3-8}$ carboxylic acid copolymer(s) or melt-processible ionomer(s) thereof (ionomers that are not neutralized to the level that they have become intractable, that is not melt-processible) with (1) one or more aliphatic, mono-functional, saturated or unsaturated organic acids having fewer than 36 carbon atoms or salts of the organic acids, and then concurrently or subsequently (b) Adding a sufficient amount of a cation source to increase the level of neutralization all the acid moieties (including those in the acid copolymer and in the organic acid) to greater than 90%, preferably near 100%, more preferably to 100%.

Preferably, highly-neutralized thermoplastics of the invention can be made by:

(a) melt-blending (1) ethylene, $\alpha,\beta$ ethylenically unsaturated $C_{3-8}$ carboxylic acid copolymer(s) or melt-processible ionomer(s) thereof that have their crystallinity disrupted by addition of a softening monomer or other means with (2) sufficient non-volatile, non-migratory agents to substantially remove the remaining ethylene crystallinity, and then concurrently or subsequently (b) Adding a sufficient amount of a cation source to increase the level of neutralization all the acid moieties (including those in the acid copolymer and in the organic acid if the non-volatile, non-migratory agent is an organic acid) to greater than 90%, preferably near 100%, more preferably to 100%.

The acid copolymers used in the present invention to make the ionomers are preferably 'direct' acid copolymers. They are preferably alpha olefin, particularly ethylene, $C_{3-8}$ $\alpha,\beta$ ethylenically unsaturated carboxylic acid, particularly acrylic and methacrylic acid, copolymers. They may optionally contain a third softening monomer. By "softening", it is meant that the crystallinity is disrupted (the polymer is made less crystalline). Suitable "softening" comonomers are monomers selected from alkyl acrylate, and alkyl methacrylate, wherein the alkyl groups have from 1–8 carbon atoms.

The acid copolymers, when the alpha olefin is ethylene, can be described as E/X/Y copolymers where E is ethylene, X is the $\alpha,\beta$ ethylenically unsaturated carboxylic acid, and Y is a softening comonomer. X is preferably present in 3–30 (preferably 4–25, most preferably 5–20) wt. % of the polymer, and Y is preferably present in 0–30 (alternatively 3–25 or 10–23) wt. % of the polymer.

Spheres were prepared using fully neutralized ionomers A and B.

TABLE 2

| Sample | Resin Type (%) | Acid Type (%) | Cation (% neut*.) | M.I. g./10 min |
|---|---|---|---|---|
| 1A | A(60) | OLEIC(40) | Mg(100) | 1.0 |
| 2B | A(60) | OLEIC(40) | Mg(105)* | 0.9 |
| 3C | B(60) | OLEIC(40) | Mg(100) | 0.9 |
| 4D | B(60) | OLEIC(40) | Mg(105)* | 0.9 |
| 5E | B(60) | STEARIC(40) | Mg(100) | 0.85 |

A - ethylene, 14.8% normal butyl acrylate, 8.3% acrylic acid
B - ethylene, 14.9% normal butyl acrylate, 10.1% acrylic acid
*indicates that cation was sufficient to neutralize 105% of all the acid in the resin and the organic acid.

These compositions were molded into 1.53 inch diameter spheres for which data is presented in the following table.

TABLE 3

| Sample | Atti Compression | COR @ 125 FT/SEC |
|---|---|---|
| 1A | 75 | .826 |
| 2B | 75 | .826 |
| 3C | 78 | .837 |
| 4D | 76 | .837 |
| 5E | 97 | .807 |

Further testing of commercially available highly neutralized polymers HNP1 and HNP2 had the following properties.

TABLE 4

Material Properties

|  | HNP1 | HNP2 |
|---|---|---|
| Specific Gravity (g/cc) | 0.966 | 0.974 |
| Melt Flow @ 190 C Kg load | 0.65 | 1.0 |
| Shore D Flex Bar (40 hr) | 47.0 | 46.0 |
| Shore D Flex Bar (2 week) | 51.0 | 48.0 |
| Flex Modulus Kpsi (40 hr) | 25.8 | 16.1 |
| Flex Modulus Kpsi (2 week) | 39.9 | 21.0 |
| DSC Melting Point (° C.) | 61.0 | 61/101 |
| Moisture (ppm) | 1500 | 4500 |
| Wt % Mg | 2.65 | 2.96 |

SOLID SPHERE DATA

| MATERIAL | HNP1 | HNP2 | HNP2 | HNP1 | HNP1/HNP2 |
|---|---|---|---|---|---|
| Specific Gravity (g/cc) | 0.954 | 0.959 | 1.153 | 1.146 | 1.148 |
| Filler Type | None | None | Tungsten | Tungsten | Tungsten |
| Compression | 107 | 83 | 86 | 62 | 72 |
| CoR | 0.827 | 0.853 | 0.844 | 0.806 | 0.822 |
| Shore D | 51 | 47 | 49 | 42 | 45 |
| Shore C |  |  | 79 | 72 | 75 |

These materials are exemplary examples of the preferred center and/or core layer compositions of the present invention. They may also be used as a cover layer herein.

The golf ball of the present invention can have an overall diameter of any size. Although the United States Golf Association (USGA) specifications limit the minimum size of a competition golf ball to more than 1.680 inches in diameter, there is no specification as to the maximum diameter. Moreover, golf balls of any size can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches.

While it is apparent that the illustrative embodiments of the invention herein disclosed fulfill the objectives stated above, it will be appreciated that numerous modifications and other embodiments may be devised by those skilled in the art. Therefore, it will be understood that the appended claims are intended to cover all such modifications and embodiments which come within the spirit and scope of the present invention.

What is claimed is:

1. A golf ball comprising:
   a multi-layer core having:
   a center comprised of a fully neutralized ionomer and having a Shore C surface hardness of less than about 85 and a compression of less than 90,
   at least one rigid outer core layer having a flex modulus greater than 40,000 psi and a Shore C hardness of greater than 80;
   an intermediate core layer interposed between the center and the rigid outer core layer having a flex modulus less than 20,000 psi and a Shore C hardness less than 60; and
   a cover having a Shore D hardness of less than 65.

2. The golf ball according to claim 1, wherein the center has a compression of less than 75.

3. The golf ball according to claim 1, wherein the center has a Shore C hardness of less than 75.

4. The golf ball according to claim 1, wherein at least one rigid outer core layer has a Shore C hardness of greater than 85.

5. The golf ball according to claim 1, wherein the cover has a Shore D hardness of less than 60.

6. The golf ball according to claim 1 wherein the multi-layer core has a diameter greater than 1.55 inches.

7. The golf ball according to claim 1, wherein each core layer has a thickness from about 0.015 to 0.05 inches.

8. The golf ball according to claim 1, wherein the ionomer comprises a polymer containing an acid group, a base, and an organic acid or a salt thereof, the base and the organic acid or salt thereof being present in sufficient amounts such that the polymer is fully neutralized.

9. The golf ball according to claim 1, wherein the ionomer is neutralized by one or more alkali metal, transition metal, or alkaline earth metal cation.

10. The golf ball according to claim 8, wherein the alkaline earth metal cation is selected from the group consisting of lithium, sodium, potassium, magnesium, calcium, barium, zinc, or a combination of such cations.

11. The golf ball according to claim 1, wherein the center has a specific gravity of less than 1.1 g/cc.

12. The golf ball according to claim 11, wherein at least one of the core layers has a specific gravity of greater than 1.25 g/cc.

13. The golf ball according to claim 11, wherein at least one of the core layers has a specific gravity of greater than 1.5 g/cc.

14. The golf ball according to claim 11, wherein at least one of the core layers has a specific gravity of greater than 1.75 g/cc.

15. A golf ball comprising:
   a multi-layer core having:
   a center having a Shore C surface hardness of less than about 85 and a compression of less than 90,
   at least one outer core layer having a Shore C hardness of greater than 80, and a specific gravity of greater than 1.25 g/cc; and
   a cover having a Shore D hardness of less than 65,
   wherein the center and at least one outer core layer is comprised of an ionomer resin having a fully neutralized acid moiety.

16. The golf ball according to claim 15, wherein the acid is selected from a group consisting of caproic acid, caprylic acid, capric acid, lauric acid, stearic acid, behenic acid, erucic acid, oleic acid and linoleic acid.

17. The golf ball according to claim 15, wherein the center has a Shore C hardness of less than 75.

18. The golf ball according to claim 15, wherein the center has a Shore C hardness of less than 66.

19. The golf ball according to claim 15, wherein at least one outer core layer has a Shore C hardness of greater than 85.

20. The golf ball according to claim 15, wherein at least one outermost core layer has a specific gravity of greater than 1.30 g/cc.

21. The golf ball according to claim 15, wherein at least one outermost core layer has a specific gravity of greater than 1.50 g/cc.

22. The golf ball according to claim 15, wherein at least one outermost core layer has a specific gravity of greater than 1.75 g/cc.

23. The golf ball according to claim 15, wherein the center has a specific gravity of less than 1.1 g/cc.

24. The golf ball according to claim 15, wherein the cover has a Shore D hardness of less than 60.

25. The golf ball according to claim 15, wherein the multi-layer core has a diameter of from 1.50 inches to 1.66 inches.

26. A golf ball comprising:
a multi-layer core having:
a center comprised of an ionomer resin with a fully neutralized acid moiety and having a Shore C surface hardness of less than about 85 and a compression of less than 90,
a diameter from 1.58 inches to 1.66 inches,
at least one outer core layer having a Shore C hardness of greater than 80, and a specific gravity of greater than 1.25 g/cc; and
a cover having a Shore D hardness of less than 65.

27. A golf ball comprising:
a multi-layer core having:
a center having a Shore C surface hardness of less than about 85 and a compression of less than 90,
at least one outer core layer having a Shore C hardness of greater than 80, and a specific gravity greater than 1.25 g/cc,
a second outer core layer comprising an Ionomer resin with a fully neutralized acid moiety; and
at least one cover layer;
the at least one cover layer having a Shore D hardness of less than 65: and,
the at least one cover layer is selected from a cast or reaction-injection moldable thermosetting material.

28. The golf ball according to claim 27, further comprises a second cover layer comprising an ionomer, thermoplastic polyurethane, polyamide, polyester or a single-site catalyzed polymer.

29. The golf ball according to claim 27, wherein the cover comprises a single layer having a thickness of about 0.010 inches to about 0.090 inches.

30. The golf ball according to claim 27, wherein the cover comprises a single layer having a thickness of about 0.020 inches to about 0.050 inches.

\* \* \* \* \*